Figure 1:
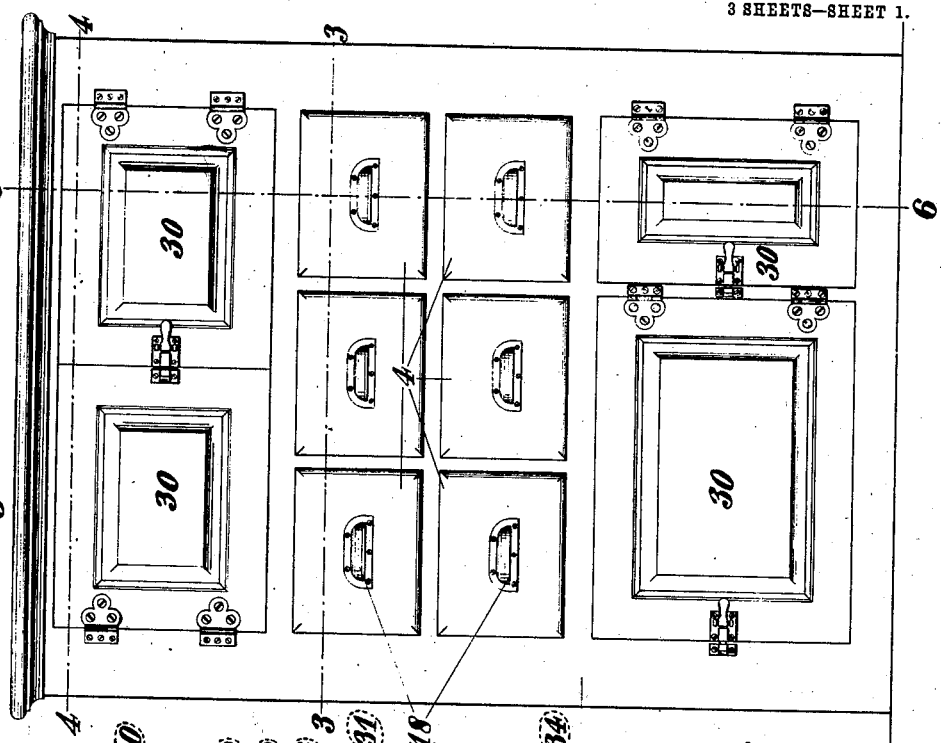

T. G. McELROY.
REFRIGERATOR.
APPLICATION FILED FEB. 28, 1906.

959,376.

Patented May 24, 1910.
3 SHEETS—SHEET 1.

Witnesses:
Geo. G. Anderson.
Elliott R. Goldsmith

Inventor:
Thomas George McElroy,
By Hugh K. Wagner,
Attorney.

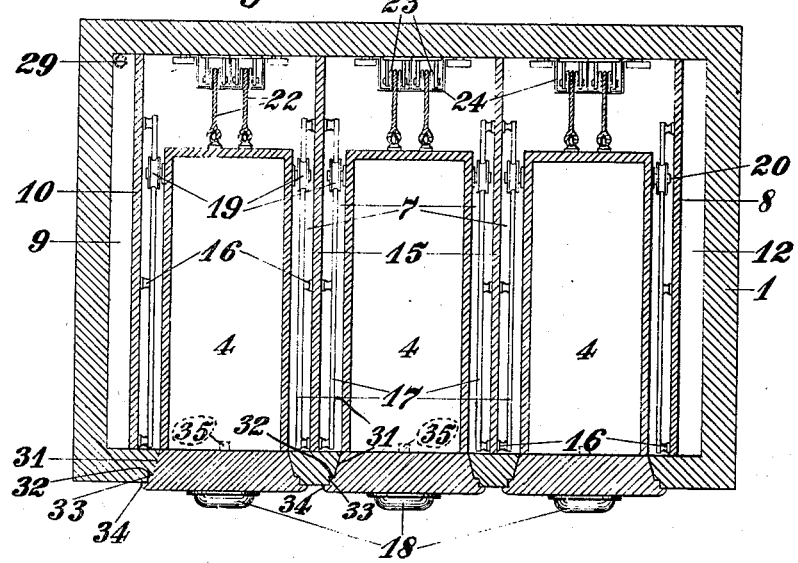
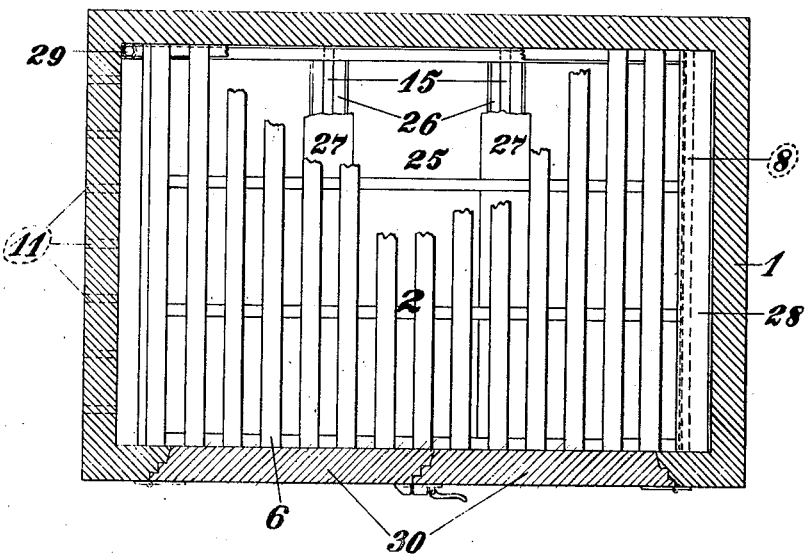

T. G. McELROY.
REFRIGERATOR.
APPLICATION FILED FEB. 28, 1906.

959,376.

Patented May 24, 1910.
3 SHEETS—SHEET 3.

Witnesses:
Geo. G. Anderson.
Elliott R. Goldsmith

Inventor:
Thomas George McElroy
By Hugh K. Wagner,
Attorney.

UNITED STATES PATENT OFFICE.

THOMAS GEORGE McELROY, OF OTTUMWA, IOWA.

REFRIGERATOR.

959,376.  Specification of Letters Patent.  Patented May 24, 1910.

Application filed February 28, 1906. Serial No. 303,406.

*To all whom it may concern:*

Be it known that I, THOMAS GEORGE MC-ELROY, a citizen of the United States, residing at the city of Ottumwa, in the county of Wapello and State of Iowa, have invented certain new and useful Improvements in Refrigerators, of which the following is a specification, reference being had therein to the accompanying drawings.
This invention relates to refrigerators, and its particular object is to provide within a refrigerator a plurality of independent sliding receptacles for the articles to be stored, the outer ends of which receptacles are conveniently exposed to grasp from the exterior and so formed as most effectively to exclude the entrance of warm air from the outside, said receptacles being, also, arranged to return automatically to their places after withdrawal for the removal of articles therefrom.

This refrigerator is especially well adapted for use in short-order restaurants and hotel kitchens and the like, because each kind of different articles (such as steaks, chops, eggs, etc.) can be kept in a separate receptacle. Thus, when an order of chops is desired, only that particular receptacle containing same needs to be opened, while the other ones remain closed, and their refrigeration is not wasted.

A further advantage to be derived from the use of separate receptacles for the various articles is that many things which are kept in a refrigerator suffer deterioration when placed in the same chamber with certain other substances. Thus, for example, milk, butter, and most dairy products have their quality impaired by the odor of onions and other strong vegetables, and many meats, especially the better grades, and some fresh fruits, are peculiarly susceptible to the influence of odors arising from other food-products which are likely to be stored in a refrigerator.

In the style of refrigerators now in common use, closed by doors, and having only one compartment, a great deal of refrigeration is wasted, for two reasons: (1) Said one relatively large compartment is opened every time any one kind or part of its contents is to be removed; (2) the opening of the doors is in a plane horizontal to the greater part of the height of the air-space within the compartment, and, when open, a body of warm or hot air of equal height and other dimensions is located opposite the refrigerated compartment; whereupon interchange of temperatures immediately commences, with the result that some of the refrigeration is wasted. Moreover, the movement of the door while opening tends to create a vacuum in front of the opened compartment, into which the cold air rushes, mingling there with surrounding warm or hot air. When the door is again closed, the air thus heated is pushed into the compartment, and the temperature thereof thus raised, whereby waste of refrigeration is caused and loss of ice ensues.

Owing to the arrangement of the receptacles in the structure hereinafter described, consisting of drawers lying horizontally and pulled out in a horizontal direction, and due to the law of nature, that cold air does not ascend in atmosphere of a higher temperature, it is impossible for the heated exterior air to penetrate the receptacles in said structure at all, because said drawers are filled with cold air, which is heavier and denser than said exterior heated air, and will, therefore, not give place to same when exposed thereto.

Other features of invention will be hereinafter described, and afterward pointed out in the claims.

Figure 2:
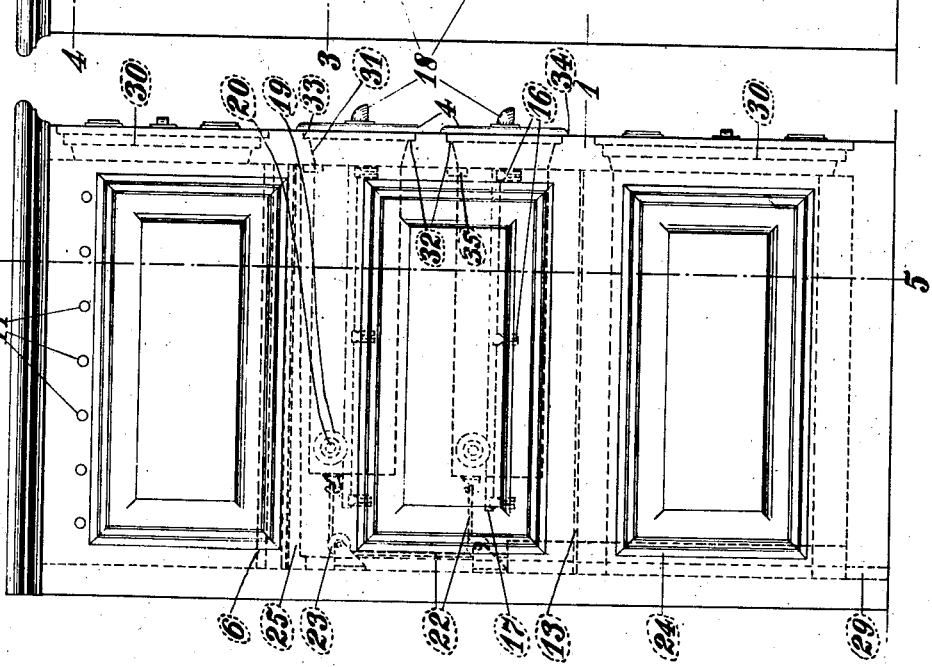
Figure 5:
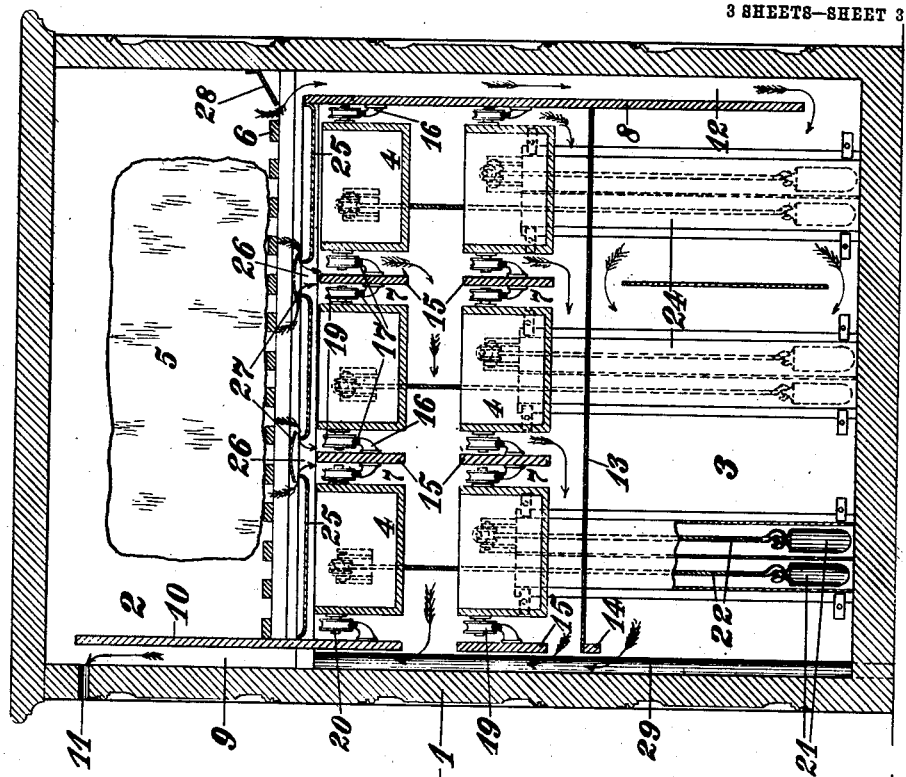
Figure 6:
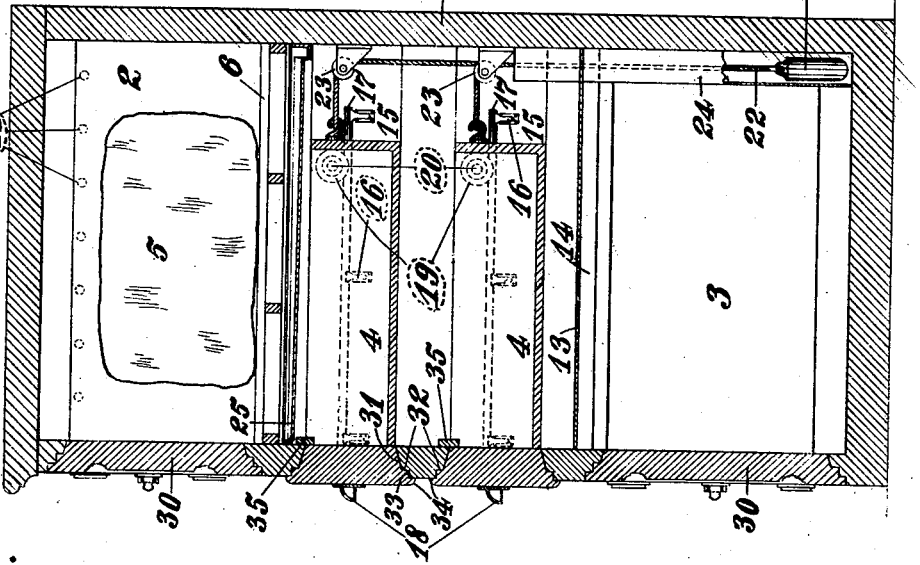

In the drawings accompanying this specification and forming part of same, in which like numbers of reference denote like parts wherever they occur, Figure 1 is a front elevation; Fig. 2 is a side elevation; Fig. 3 is a horizontal sectional view on the line 3—3, Fig. 1; Fig. 4 is a horizontal transverse section on the line 4—4, Fig. 1; Fig. 5 is a vertical sectional view on the line 5—5, Fig. 2; and Fig. 6 is a vertical sectional view on the line 6—6, Fig. 1.

The casing 1 is internally divided into three main compartments, namely, the icebox 2, large preserving chamber 3, and the space in which a plurality of drawers 4 are located.

The ice 5 is placed on the rack 6, and, reducing the temperature of the air in the icebox 2, sets up a circulation of air within the entire casing 1, by inducing first a downward current of cooled air immediately below the ice 5 and through the passages 7 between vertical rows of drawers 4, as indicated by the arrows. This cold air is forced to flow to the left in Fig. 5 by the vertically-disposed deflector or diaphragm 8, and follows the course indicated by the arrows, while the warmer air around drawers 4 is thus forced through passage 9, past diaphragm 10, and makes its exit through ports 11, any part not escaping therethrough passing over diaphragm 10 into icebox 2, where it is cooled. Cold air from icebox 2 descends, also, through passage 12, and entering chamber 3 cools same, the hot air therefrom following the direction indicated by the arrows, until it passes through the exit ports 11. The chamber 3 is used to contain articles too large to be put in a drawer 4 or for extra supplies.

The diaphragm 8 is supported by the rear and front walls of casing 1, and closely fits or receives partition 13, the other end of which is borne by bar 14 and its front and back being supported by front and rear walls of casing 1. The diaphragm 10 is, also, supported by the front and rear walls of casing 1. The cross-boards 15 are supported in the same manner.

From boards 15 and diaphragms 8 and 10, project brackets 16 or other supports for tracks 17 or other slideway, the drawers 4 moving longitudinally thereon when drawn outward by the pulls 18 or propelled backward. While the drawers 4 might move on slideways, as stated, my preferred form, as illustrated in the drawings, consists of drawers provided on both sides with wheels 19, the axles 20 of which are stationary and are fixed to the drawers 4. It is obvious that, when a drawer 4 is pulled, it will travel forward very easily, the wheels or grooved rollers 19 running on the rails 17. Motion in the opposite direction is produced with equal ease, and is accelerated and rendered automatic by the provision of counterweights 21 hooked or otherwise removably attached to the cords or chains 22, which in turn are hooked or otherwise removably attached to drawers 4. The cords 22 travel over pulleys 23, and the weights 21 are contained within a removable casing 24 for the protection of articles placed in chamber 3 from contact therewith and to prevent interference with their proper operation by such contact.

The drip-pan 25 is supported by the front and rear walls of casing 1 and between diaphragms 8 and 10. Openings 26 therethrough, protected by shields 27, allow the passage of cold air from the icebox 2 to the spaces 7. A deflector 28 guards passage 12, and a drainpipe 29 provides an exit for the drip water. The front of icebox 2 and chamber 3 is closed by doors 30, but no door in front of drawers 4 is provided, because ease of access is desired.

The front end of each drawer 4 is tapered inwardly at 31, and fits a correspondingly beveled portion in the formation of the opening therefor in the front wall of casing 1. A shoulder 32 formed in said wall forward of said tapered portion and surrounding the opening for the drawer, receives a step-up flange 33 extending all around said drawer, and the step-up flange 34, extending around the drawer and somewhat farther in every direction than flange 33, overlaps the outer face of said wall. Thus a tightly-fitting and air-tight closure for the compartment containing drawers 4 is secured; the objectionable use of doors for the main refrigeration compartment (as hereinabove described) is obviated; and means are thus provided insuring a closure which will at all times seat tightly in lieu of the hinged closures which cease to close the apertures tightly as soon as their hinges and locks have become loose through wear.

The complete withdrawal of a drawer 4 is normally prevented by a button 35, which will strike the rear wall of the drawer, but said button can be turned so as to allow removal of the drawer for cleaning. Obviously, however, it is necessary to draw out each drawer only so far as will enable access to its contents, and usually, therefore, it would be only partly pulled out. In this way, the minimum of refrigerated space is exposed to the exterior atmosphere at one time, and even that under conditions which preclude the warmer air forcing itself into such refrigerated space, for the reason that, as above explained warm air has no tendency to descend into refrigerated space. When a drawer has been partly pulled out, its rear end and side walls still serve to close the aperture in casing 1 through which it projects. Moreover, each drawer is independent of every other one, and only when its own contents are desired is it opened, and that only for the briefest space of time, as it automatically returns to its place as soon as the force that pulled it out is no longer exerted.

It will be observed that an advantage attendant upon the use of drawers in a refrigerator is that each particular article is accessible as soon as the receptacle containing same is drawn out, and, in like manner, articles can be conveniently introduced into said receptacles, because in both operations it is not necessary to shift pans, crocks, or other vessels or articles around in the refrigerator-space. A place is provided for everything, and everything will be put in its place. In order to attain the maximum degree of accessibility to said drawers, the tapered end with step-up flanges has been provided, so as to make it unnecessary to close the front of the drawer-space with doors. It will be perceived, also, that great advantages in the way of air circulation and distribution of refrigeration are secured by the arrangement of the icebox above the drawer-space and preserving-chamber, and the provision of the openings through the drip-pan adjacent to the passages or spaces between vertical rows of drawers, and by the other arrangements whereby cold air is allowed to descend to all parts of the refrigerated space, and means supplied for the escape of warmer air.

Applicant has had a refrigerator of this type in practical use in his restaurant kitchen, and by actual use, as well as inquiry, finds that it fills a long-felt want for such purposes. While, however, it is particularly useful in such a location, it is well adapted for general use, and in that connection it is proper to note that the number of drawers may be either increased or diminished in accordance with the size or proposed use of any particular specimen.

Having thus described my said invention, what I claim and desire to secure by Letters-Patent is:

1. The combination of a refrigerator-casing having apertures; vertical members arranged in spaced parallel relation within said casing and transversely of the same; drawers arranged between said members and normally closing said apertures; series of brackets secured to said members; a track secured to each series of brackets; a pair of supporting wheels secured to opposite sides of each drawer and arranged to travel upon the adjacent tracks; a flexible element connected to the rear end of each drawer; and a weight secured to each of said flexible elements for automatically returning the corresponding drawer to closed position after having been opened.

2. The combination of a refrigerator casing having apertures in its front wall; drawers slidable through said apertures and normally closing the same; and buttons attached to the inner face of said wall adjacent said apertures and arranged for movement into one position to contact with the rear ends of the drawers, to prevent complete withdrawal of the latter, and into a second position to escape such contact and to permit such removal.

In testimony whereof I have affixed my signature in presence of two witnesses.

THOMAS GEORGE McELROY.

Witnesses:
　WALTER H. McELROY,
　EDITH A. HART.